(12) United States Patent
Subramaniam

(10) Patent No.: US 10,686,667 B1
(45) Date of Patent: Jun. 16, 2020

(54) AGENT-ASSISTED DISCOVERY OF NETWORK DEVICES AND SERVICES

(71) Applicant: ServiceNow, Inc., Santa Clara, CA (US)

(72) Inventor: Sreenevas Subramaniam, Dublin, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 16/292,068

(22) Filed: Mar. 4, 2019

(51) Int. Cl.
*H04L 12/24* (2006.01)

(52) U.S. Cl.
CPC ............ *H04L 41/12* (2013.01); *H04L 41/046* (2013.01)

(58) Field of Classification Search
CPC ............................... H04L 41/12; H04L 41/046
See application file for complete search history.

(56) References Cited

U.S. PATENT DOCUMENTS

| | | | | |
|---|---|---|---|---|
| 10,116,461 B2 * | 10/2018 | Fairweather | ............... | G06F 8/76 |
| 2010/0115520 A1 * | 5/2010 | Kohno | .................. | G06F 9/4843 718/101 |
| 2016/0050126 A1 * | 2/2016 | Rubio | ................. | H04L 41/5054 709/226 |

OTHER PUBLICATIONS

"Welcome to osquery" webpage (obtained on Feb. 15, 2019 from https://osquery.readthedocs.io/en/stable/#getting-started).
"Introducing osquery—Facebook Code" webpage (obtained on Feb. 15, 2019 from https://code.fb.com/security/introducing-osquery/).

* cited by examiner

*Primary Examiner* — Arvin Eskandarnia
(74) *Attorney, Agent, or Firm* — Fletcher Yoder PC

(57) ABSTRACT

A computing system may include persistent storage disposed within a remote network management platform and a proxy software application disposed within a managed network that is associated with the remote network management platform. The proxy software application may be configured to: (i) receive, from the remote network management platform, a discovery request; (ii) determine that the discovery request targets a computing device and is to be performed by way of a software agent deployed on the computing device; (iii) based on the discovery request, generate, by way of query mappings, a query expression; (iv) transmit, to the software agent, the query expression; (v) receive, from the software agent, a query response specifying configuration information related to the computing device; (vi) generate, by way of response mappings, a discovery response representing the configuration information related to the computing device; and (vii) transmit, to the remote network management platform, the discovery response.

20 Claims, 8 Drawing Sheets

AGENT-ASSISTED DISCOVERY OF NETWORK DEVICES AND SERVICES

BACKGROUND

In practice, management of an enterprise's network may involve gathering information regarding the configuration and operational aspects of the network. For instance, the enterprise might have tools with which to facilitate discovery of devices, applications, and/or services on its own network. Such discovery may involve learning that certain devices, applications, and/or services are on the network as a general matter and/or may involve gathering other information about those devices, applications, and/or services. Because enterprises might rely on discovery to assist with management of their respective networks, technical improvements to discovery-related tools could provide various benefits to enterprises.

SUMMARY

An enterprise might have various types of discovery-related tools. For example, the enterprise could deploy software agent(s) on its device(s), and those software agent(s) could provide information related to those device(s) as part of query response(s) to query expression(s) that request the information. In another example, a remote network management platform could manage the enterprise's network and could facilitate agentless discovery that does not rely on deployment of specialized software (e.g., a software agent) on device(s). Rather, agentless discovery could involve use of remote access protocols and/or standards (e.g., Simple Network Management Protocol (SNMP)), so as to discover and/or obtain information about configuration item(s), such as devices, applications, and/or services on the managed network.

In practice, the platform could transmit discovery requests to a proxy software application deployed on the managed network, so as to cause the proxy software application to engage in the agentless discovery. The proxy software application could then provide, to the platform, discovery responses that include information related to such discovery, so that the enterprise has access to this information via the platform.

Generally, there could be various similarities and differences between the various tools at issue. In particular, some tools might have at least some of the same capabilities as one another. For example, different software agents might be capable of discovering at least some of the same types of devices and/or gathering at least some of the same types of information. Similarly, agentless discovery and a given software agent might both be capable of discovering at least some of the same types of devices and/or gathering at least some of the same types of information. On the other hand, certain tool(s) might have capabilities that are different from those of other tool(s). For example, a given software agent might be able to discover certain types of devices that agentless discovery and/or other software agent(s) might not be capable of discovering, and vice versa. Other examples are also possible.

While it is beneficial for the enterprise to have different tools with various capabilities, users might encounter various challenges when using those tools. For example, formats of discovery requests and responses supported by the platform may be different respectively from query expressions and responses supported by a given software agent. Also, different software agents may respectively support different query expressions and/or responses compared to one another. As a result, a user might need to devote significant time to learn about the respective capabilities of each tool, so as to learn how to use and gain the respective benefits of the various tools. And even if the user learns how to use the various tools, the tools would likely provide separate sets of information in different respective formats, and thus the user might need to engage in a time-consuming and error-prone process that could involve converting information from one format to another, deleting of duplicative information, combining the separate sets of information and/or organizing the information, among others.

The present disclosure relates to improved discovery of configuration item(s) on a managed network. According to the present disclosure, the proxy software application could effectively translate (i) discovery requests from the platform into query expressions supported by a software agent and (ii) query responses from the software agent into discovery responses supported by the platform. The proxy software application could provide such translations between the platform and one or more software agents. In this way, the platform could integrate with software agent(s) deployed on computing device(s) of a managed network, which could help overcome the above-described challenges and could also provide for other benefits.

To facilitate the above-mentioned translations between the platform and a particular software agent, the proxy software application could have access to mapping data associated with the particular software agent. More specifically, the proxy software application could have access to query mappings between (i) formats of at least some of the discovery requests supported by the platform and (ii) at least some of the query expressions supported by the particular software agent. Additionally, the proxy software application could have access to response mappings between (i) formats of at least some of the query responses supported by the particular software agent and (ii) at least some discovery responses supported by the platform.

Given this, the proxy software application could use the mapping data to enable integration between the platform and the particular software agent. For example, the proxy software application could receive a discovery request from the platform, and could determine that the discovery request targets a particular computing device and is to be performed by way of the particular software agent. The proxy software application could then use the discovery request as basis to generate, by way of the query mappings, a query expression supported by the particular software agent. In turn, the proxy software application transmit the query expression to the particular software agent and could receive, from the particular software agent, a query response specifying configuration information related to the particular computing device. Then, the proxy software application could generate, by way of the response mappings, a discovery response that is supported by the platform and that represents the configuration information related to the particular computing device. As such, the proxy software application could transmit the discovery response to the platform, so that the platform could then store, in a database, the configuration information as configuration item(s) and/or carry out other actions.

Overall, the disclosed approach for integrating the platform with one or more software agents could have numerous benefits. As an initial matter, an enterprise could utilize the platform to obtain information from software agent(s) without necessarily needing to learn about the query expressions and/or responses respectively supported by each such software agent, thereby allowing the enterprise to gain the respective benefits of the software agent(s) and to seamlessly transition from using one software agent for discovery to using another software agent for discovery. Moreover, the platform could discover configuration items or otherwise obtain information that the platform might not be able to discover or otherwise obtain when engaging in agentless discovery, thereby expanding the scope of what the platform could discover on behalf of the enterprise's managed network. Other advantages are also possible.

Accordingly, a first example embodiment may involve a computing system including persistent storage disposed within a remote network management platform associated with a managed network as well as a proxy software application disposed within the managed network. The persistent storage may contain representations of discovered configuration items within the managed network. Also, a software agent may be deployed on a computing device of the managed network and may be configured to respond to query expressions with query responses specifying configurations of the computing device. Further, the proxy software application (i) may be configured to cause discovery of configuration items on the computing device in response to receiving discovery requests from the remote network management platform, (ii) may have access to query mappings between formats of at least some of the discovery requests and at least some of the query expressions, and (iii) may have access to response mappings between formats of at least some of the query responses and at least some discovery responses supported by the remote network management platform.

Yet further, the proxy software application may be configured to: receive, from the remote network management platform, a discovery request; determine that the discovery request targets the computing device and is to be performed by way of the software agent; based on the discovery request, generate, by way of the query mappings, a query expression; transmit, to the software agent, the query expression; receive, from the software agent, a query response specifying configuration information related to the computing device; generate, by way of the response mappings, a discovery response representing the configuration information related to the computing device; and transmit, to the remote network management platform, the discovery response.

A second example embodiment may involve receiving, by a proxy software application from a remote network management platform, a discovery request, where the remote network management platform is associated with a managed network, where persistent storage is disposed within a remote network management platform, where the persistent storage contains representations of discovered configuration items within the managed network, where a software agent is deployed on a computing device of the managed network and configured to respond to query expressions with query responses specifying configurations of the computing device, where the proxy software application is disposed within the managed network, and wherein the proxy software application (i) is configured to cause discovery of configuration items on the computing device in response to receiving discovery requests from the remote network management platform, (ii) has access to query mappings between formats of at least some of the discovery requests and at least some of the query expressions, and (iii) has access to response mappings between formats of at least some of the query responses and at least some discovery responses supported by the remote network management platform.

The second example embodiment may also involve determining, the proxy software application, that the discovery request targets the computing device and is to be performed by way of the software agent. The second example embodiment may additionally involve, based on the discovery request, generating, by the proxy software application and using the query mappings, a query expression. The second example embodiment may further involve transmitting, by the proxy software application to the software agent, the query expression. The second example embodiment may yet further involve receiving, by the proxy software application from the software agent, a query response specifying configuration information related to the computing device. The second example embodiment may yet further involve generating, by the proxy software application and using the response mappings, a discovery response representing the configuration information related to the computing device. The second example embodiment may yet further involve transmitting, by the proxy software application to the remote network management platform, the discovery response.

In a third example embodiment, an article of manufacture may include a non-transitory computer-readable medium, having stored thereon program instructions that, upon execution by a computing system, cause the computing system to perform operations in accordance with the first and/or second example embodiments.

In a fourth example embodiment, a computing system may include at least one processor, as well as memory and program instructions. The program instructions may be stored in the memory, and upon execution by the at least one processor, cause the computing system to perform operations in accordance with the first and/or second example embodiments.

In a fifth example embodiment, a system may include various means for carrying out each of the operations of the first and/or second example embodiments.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
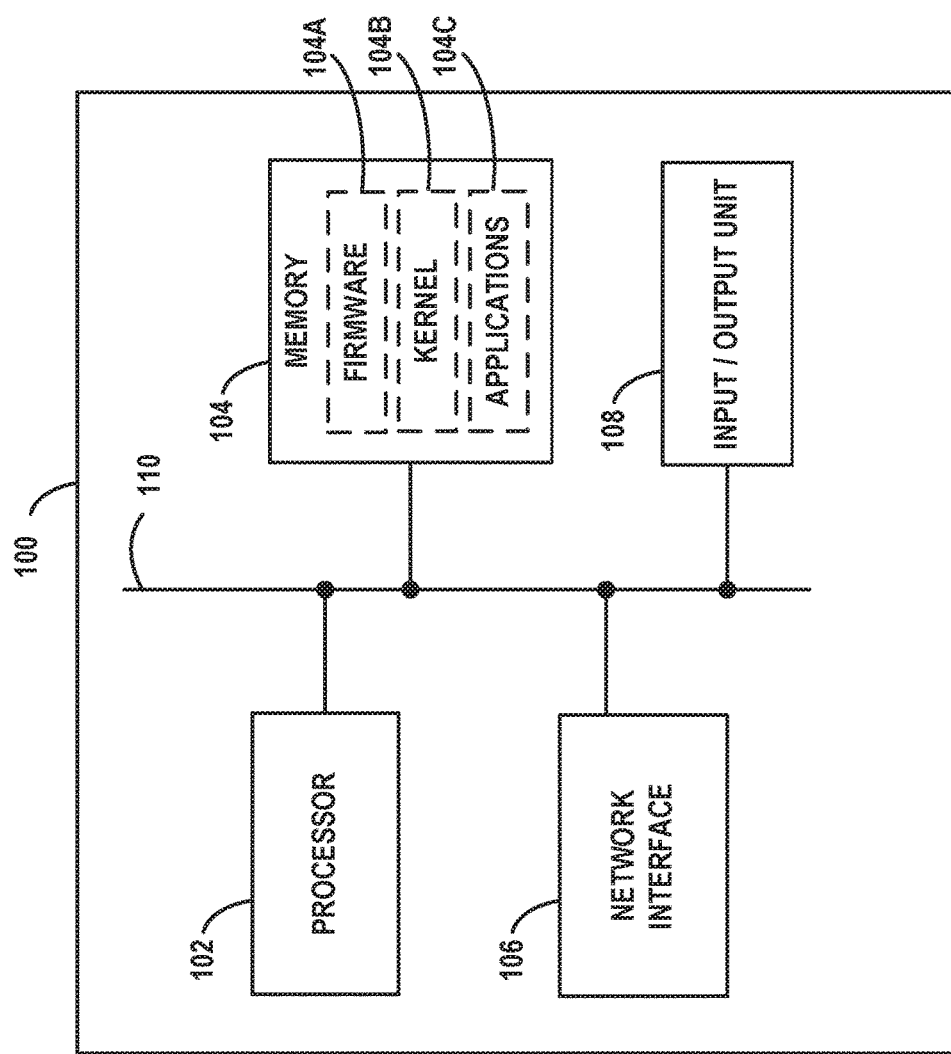
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of predefined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
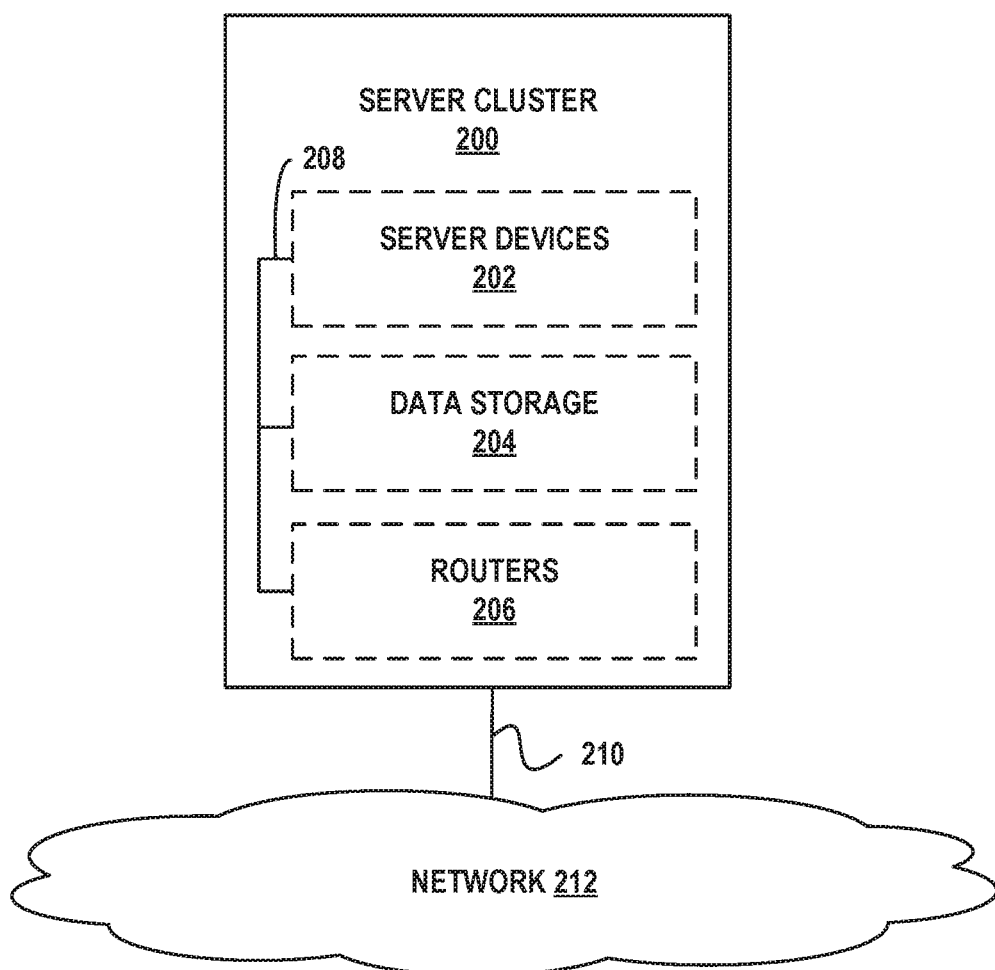
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. Example Remote Network Management Architecture

Figure 3:
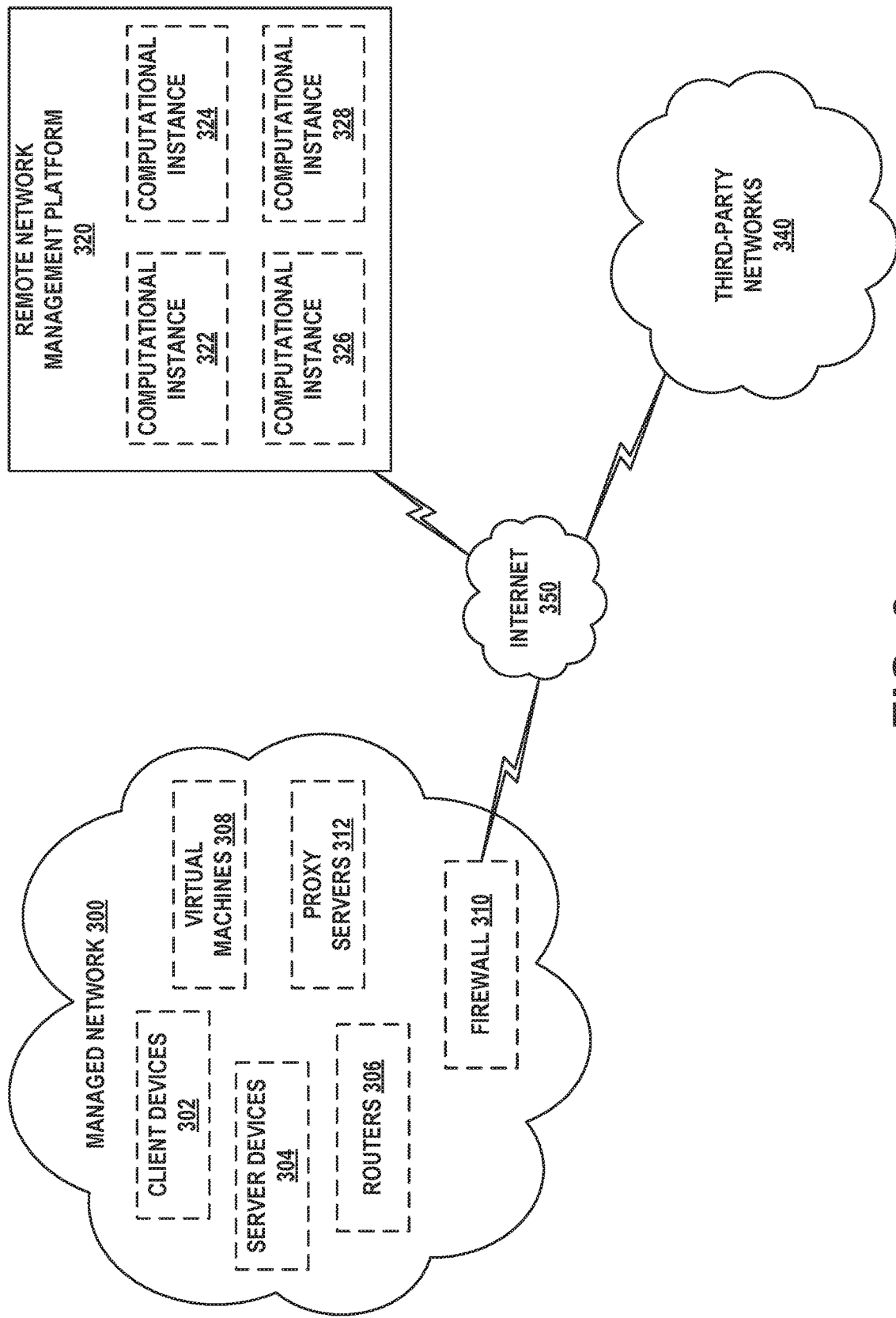
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® AZURE®. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
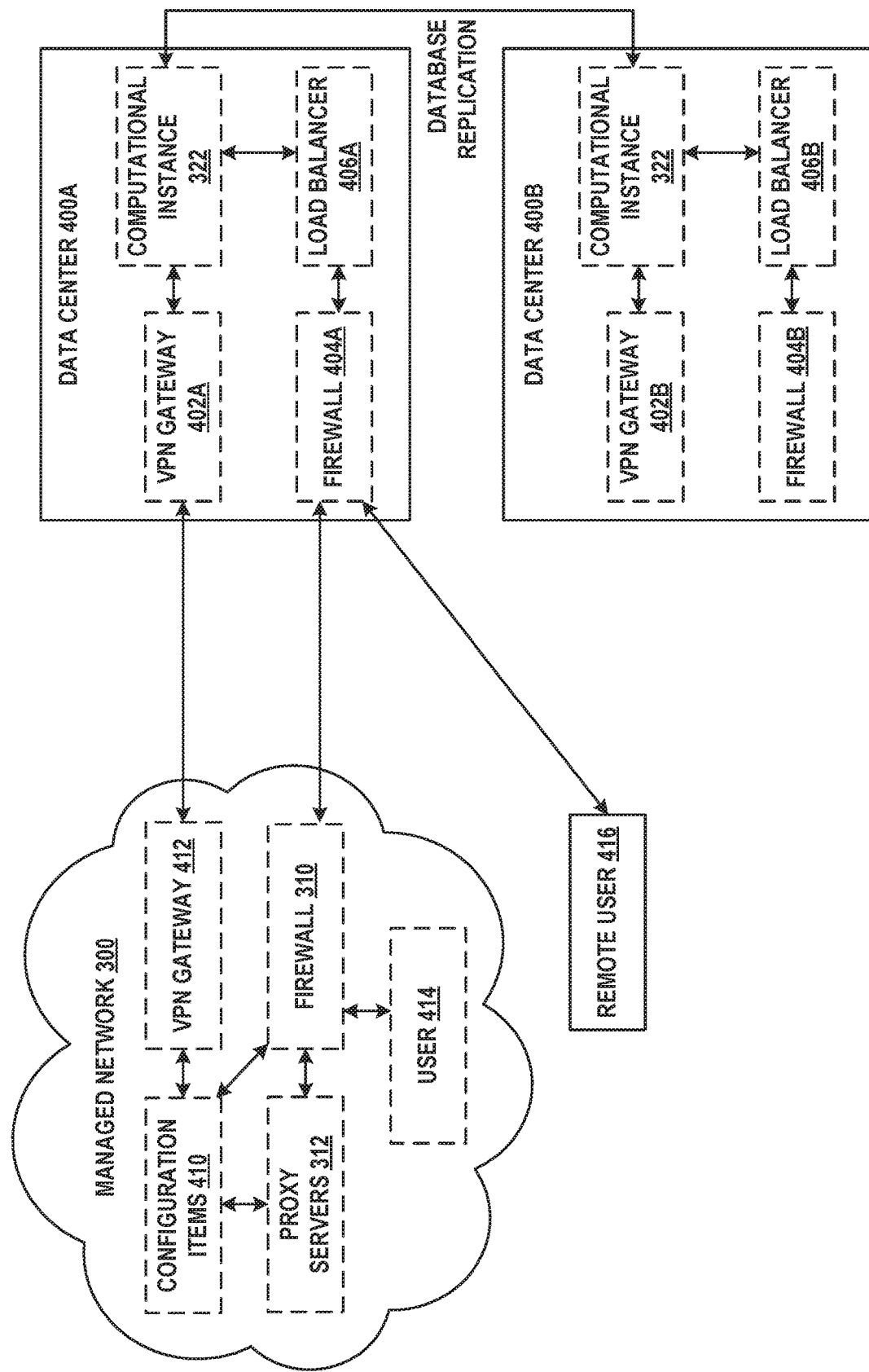
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
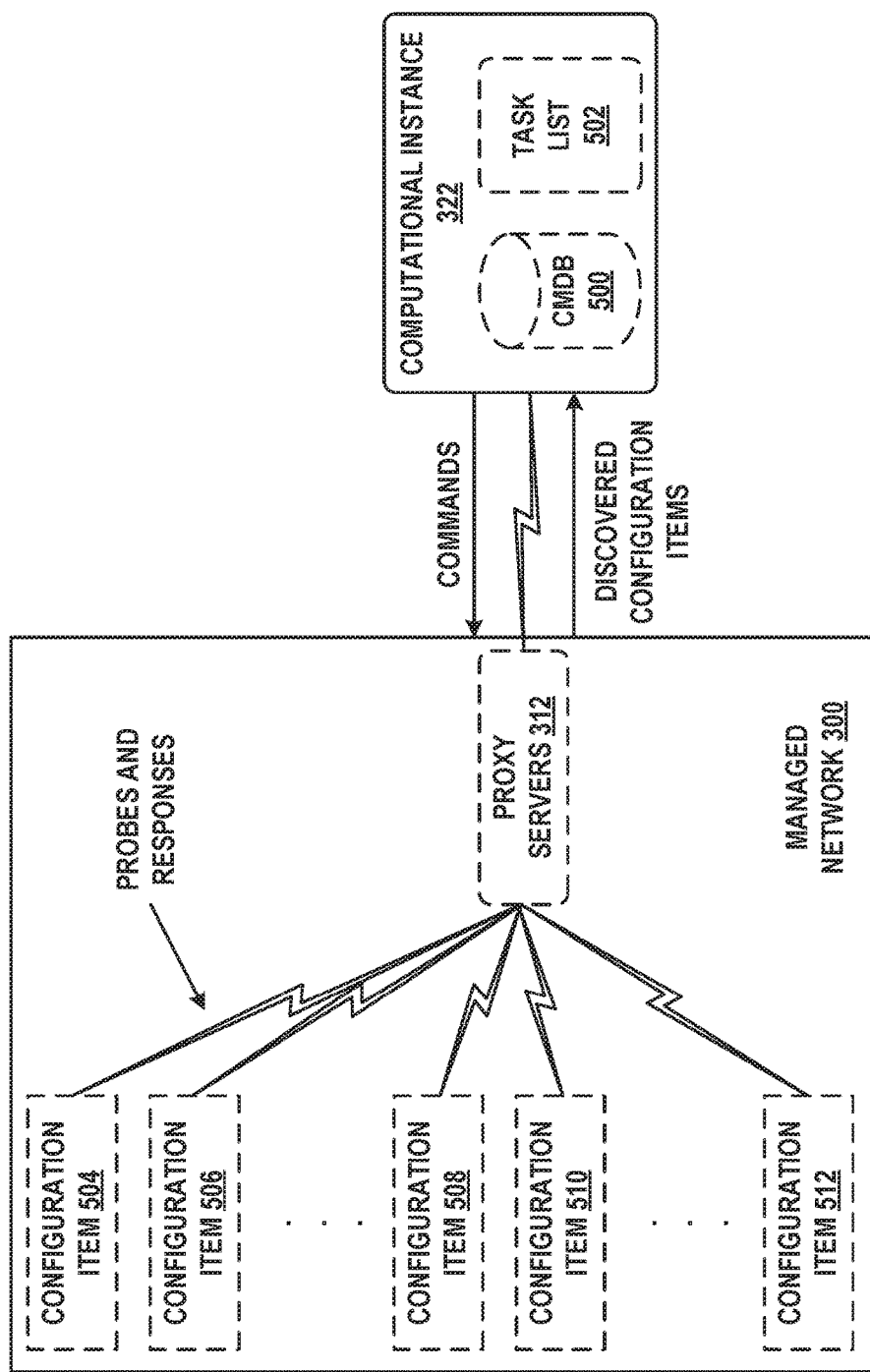
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
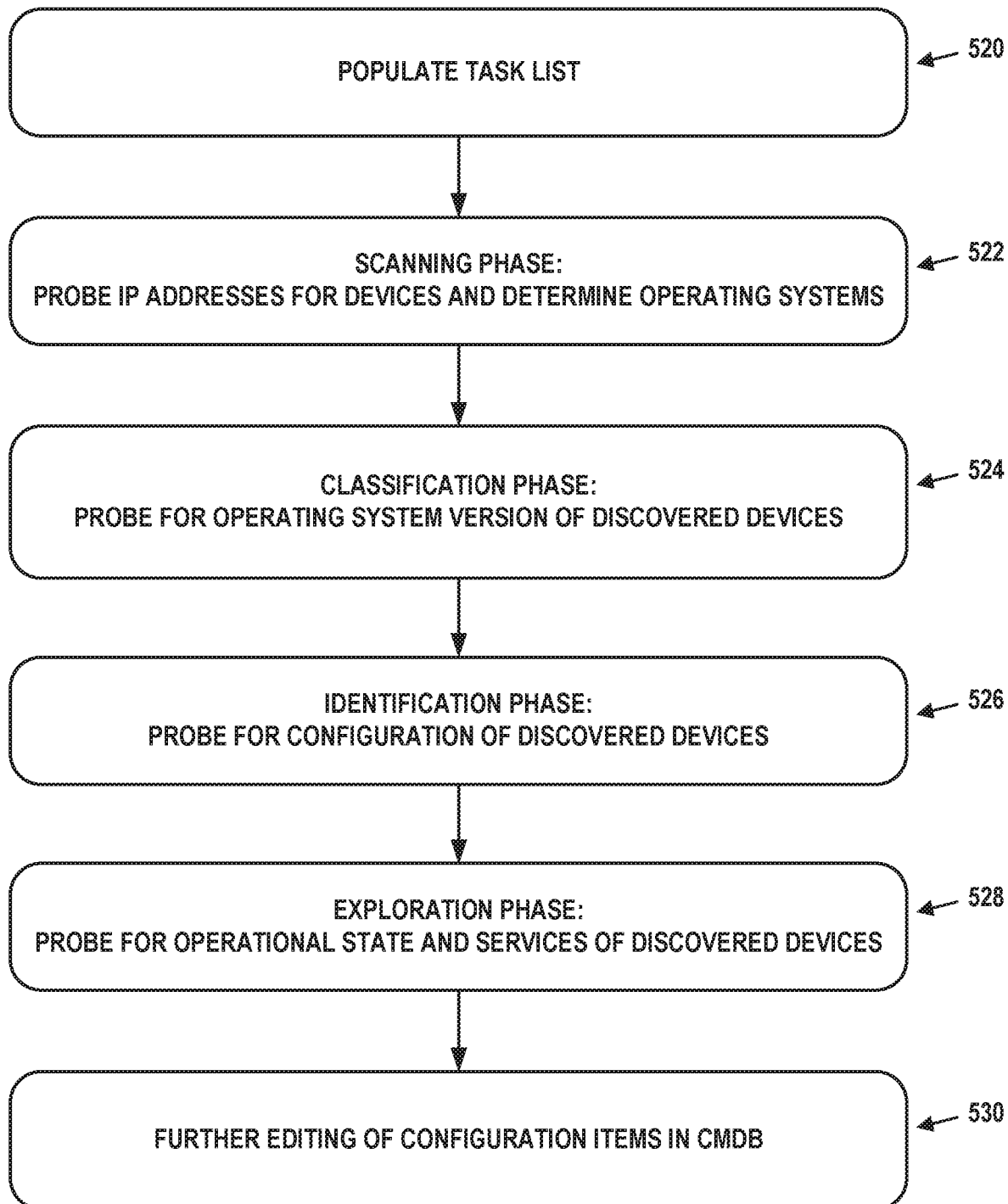
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. CMDB Identification Rules and Reconciliation

A CMDB, such as CMDB 500, provides a repository of configuration items, and when properly provisioned, can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information related to configuration items in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API). This API may use a set of configurable identification rules that can be used to uniquely identify configuration items and determine whether and how they are written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to the identification and reconciliation API, the API may attempt to match the information with one or more rules. If a match is found, the configuration item is written to the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, the identification and reconciliation API will only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by reconciliation procedures or in another fashion. These configuration items may be flagged for manual de-duplication.

VI. Agent-Assisted Discovery

Disclosed herein is an approach for integrating a remote network management platform with software agent(s) deployed on device(s) of a managed network, so as to enable agent-assisted discovery of devices, applications, and/or services on the managed network. According to the disclosed approach, a proxy software application deployed on the managed network could translate (i) discovery requests from the remote network management platform into query expressions supported by a software agent and (ii) query responses from the software agent into discovery responses supported by the remote network management platform. The proxy software application could provide such translations between the remote network management platform and one or more software agents of the same type and/or of different types.

In an example implementation, the proxy software application could receive, from the remote network management platform, a discovery request for certain information about a computing device on which a software agent is deployed, could translate the discovery request into a query expression supported by the software agent, and could then provide the query expression to the software agent. The software agent may then respond to the query expression by transmitting, to the proxy software application, a query response including the requested information about the computing device. The proxy software application could then translate the query response into a discovery response that is supported by the remote network management platform and that includes the information at issue. In turn, the proxy software application could provide the discovery response to the remote network management platform, so that the remote network management platform can store the information in a CMDB and/or take other action(s).

The disclosed approach could provide for various advantages and improvements. For example, the remote network management platform could facilitate agent-assisted discovery to discover configuration items that might not be discoverable by way of the agentless discovery described above in association with FIGS. 5A-5B. And by having the capability to facilitate both agent-assisted discovery and agentless discovery, the remote network management platform could conveniently provide an enterprise with multiple options for discovering configuration items on its managed network. Moreover, because the remote network management platform could integrate with multiple software agents that have different respective capabilities, the agent-assisted discovery could provide the respective benefits of each software agent without user(s) necessarily having to learn about different query expressions and/or responses respectively supported by the different software agents. Other advantages are also possible.

Figure 6:
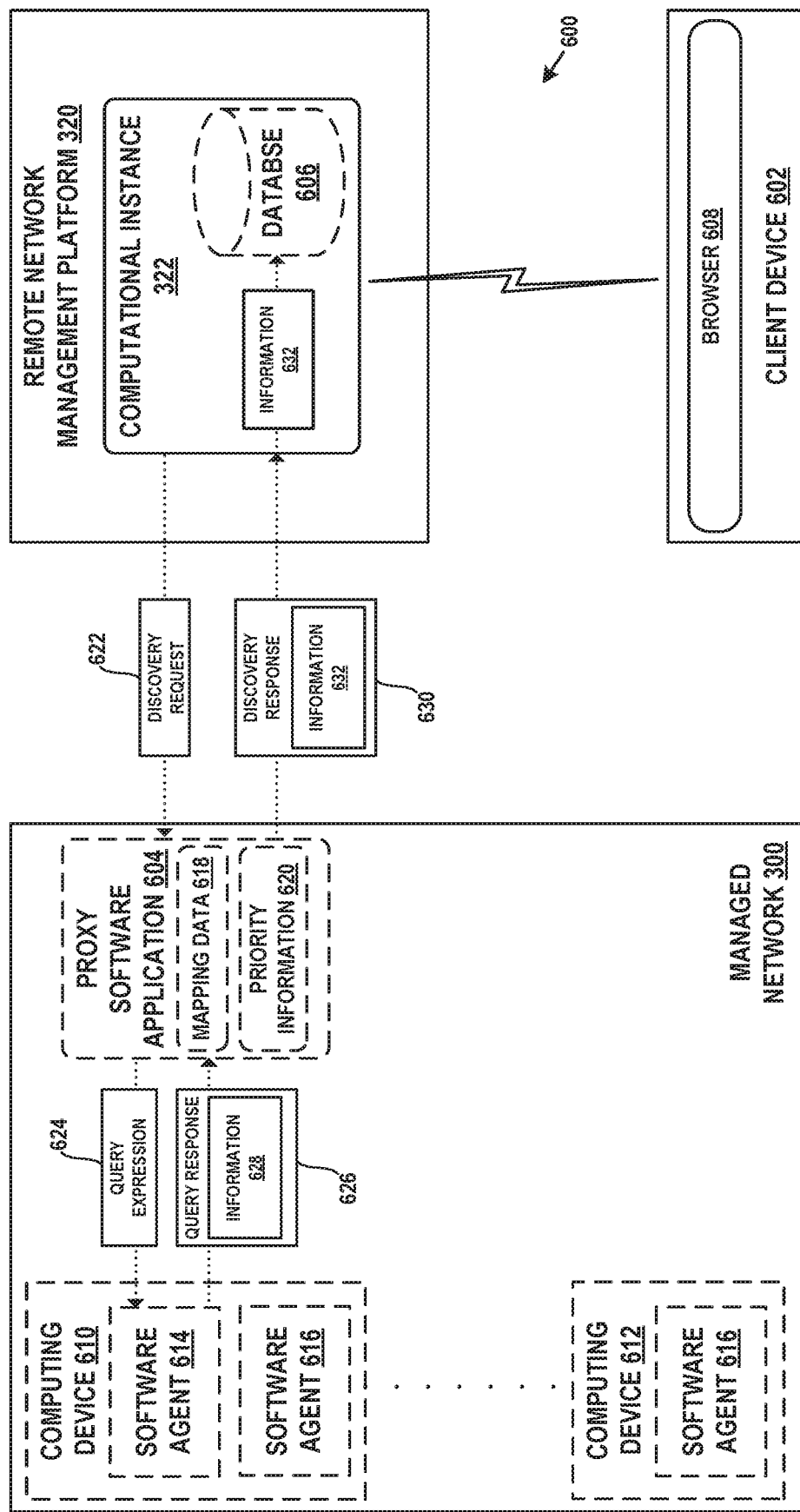
FIG. 6 depicts communications between a remote network management platform, a proxy software application, and a software agent, in accordance with example embodiments.

FIG. 6 illustrates features, components, and/or operations of a computing system 600 and of a client device 602. Although FIG. 6 illustrates a specific arrangement, operations disclosed herein may be carried out in the context of similar and/or other arrangement(s) as well without departing from the scope of the present disclosure.

The computing system 600 could include features and/or components of a managed network and/or of a remote network management platform that supports remote management of the managed network.

In particular, computing system 600 may include server device(s) (not shown). The server device(s) may contain or may otherwise have access to program instructions executable by processor(s), so as to cause the computing system 600 to carry out various operations described herein. On this point, the server device(s) may include server device(s) disposed within a computational instance of a remote network management platform, such as within computational instance 322 of remote network management platform 320. Additionally or alternatively, the server device(s) may include server device(s) disposed within the managed network 300 (e.g., proxy server 312). As a result, a proxy software application 604 could be deployed on such server device(s) within the managed network 300, so as to help facilitate communication and movement of data between the managed network 300 and remote network management platform 320.

Further, the computing system 600 may include a database 606. This database 606 could be a CMDB of a computational instance, such as CMDB 500 for example. Additionally or alternatively, database 606 may be a database that is different from a CMDB. In any case, a database could take the form of or could otherwise be referred to herein as persistent storage, among other possibilities.

Client device 602 may be one of the client devices 302 of the managed network 300, for example. Generally, the client device 702 may engage in communication with computing system 600 (e.g., with remote network management platform 320), such as via wired and/or wireless communication link(s). Moreover, as shown, the client device 702 may be configured to operate a web browser 608, which is an application that may retrieve, present, and/or navigate through information on the World Wide Web and/or on private websites.

Furthermore, FIG. 6 depicts computing devices 610-612 on managed network 300, which may be any one of the client devices 302, server devices 304, routers 306, and/or virtual machines 308 on the managed network 300. The computing devices 610-612 may be respectively configured to execute certain application(s) and/or to provide certain service(s). Such devices, applications, and/or services may be remotely discoverable by way of agentless discovery and/or by way of agent-assisted discovery, as further described herein.

Yet further, FIG. 6 illustrates that a software agent 614 could be deployed on computing device 610 and that a different software agent 616 could be deployed on both computing devices 610-612. In practice, a software agent may be a piece of software or the like capable of autonomously perform function(s) with respect to device(s) on which it is deployed, such as on behalf of an end user or other software. For instance, a software agent could receive, from an end user or other software, query expression(s) that request certain information about a computing device on which the software agent is deployed, and the software agent could respond to the end user or other software with query response(s) that include the requested information. Examples of software agents may include Osquery, Chef, and Puppet, among others.

On this point, different software agents may respectively support different query expressions and/or responses. For example, software agent 614 may be configured to support one set of query expressions and/or responses and software agent 616 may be configured to support a different set of query expressions and/or responses. In a more specific example, an end user or other software could request software agent 614 to provide a list of active processes running on computing device 610, and could do so by transmitting, to the software agent 614, a particular query expression having the following format: "SELECT [CPU ID], process_events", where [CPU ID] includes an identifier of the computing device 610. However, the particular query expression might not be supported by software agent 616. Thus, if the end user or other software submits the same request to software agent 616, the end user or other software would transmit a different query expression to software agent 616, such as one having the following format: "OBTAIN process_list FROM [CPU ID]". Other examples are also possible.

Moreover, the software agent 614, software agent 616, and agentless discovery may each have respective capabilities. For example, software agents 614 and 616 could help obtain a list of active processes running on a computing device 610 as described, and agentless discovery might also be capable of doing so. In contrast, software agent 614 could help obtain a list of Secure Sockets Layer (SSL) certificates on the computing device 610, but software agent 616 and agentless discovery might not be capable of doing so. Other examples are also possible.

According to the present disclosure, the remote network management platform 320 could integrate with software agent(s) deployed on the managed network 300, so as to enable agent-assisted discovery. To facilitate such integration with a given software agent, the proxy software application 604 could authenticate the software agent, so that the proxy software application 604 can established secured communication sessions with the software agent. Additionally, the proxy software application 604 could be configured to translate (i) discovery requests from the remote network management platform 320 into query expressions supported by the software agent and (ii) query responses from the software agent into discovery responses supported by the remote network management platform 320.

As an initial matter, the proxy software application 604 could authenticate a software agent in various ways. For example, the proxy software application 604 and the software agent could engage in currently-known and/or future-developed techniques of certificate-based authentication, such as in a TLS handshake providing mutual authentication. Other examples are also possible.

Generally, establishing a secured communication session with a software agent could in and of itself assist with discovery. In particular, after the proxy software application 604 establishes such a session with a software agent, the proxy software application 604 may receive, from the software agent, information indicating computing device(s) on which the software agent is deployed. Based on this information, the proxy software application 604 may transmit, to the remote network management platform 320, an indication that configuration item(s) of the computing device(s) are discoverable by way of the software agent. If the remote network management platform 320 did not previously discover the computing device(s), then receiving the indication may effectively amount to the remote network management platform 320 discovering that these computing device(s) are on the managed network 300.

In this way, the remote network management platform 320 could advantageously discover a computing device on the managed network 300 regardless of how long the computing device is connected to the managed network 300.

This type of discovery is particular beneficial, because agentless discovery might occur infrequently and thus might not assist with discovering computing devices, such as laptops and mobile devices, that might connect to the managed network for shorter periods of time. Other advantages are also possible.

Further, the proxy software application 604 could be configured to carry out the above-mentioned translations in various ways. For example, the proxy software application 604 could have access to mapping data 618 that enables the proxy software application 604 to carry out the translations. In some cases, the proxy software application 604 could be configured with the mapping data 618 via engineering input. In other cases, the mapping data 618 could be stored on and accessible via a server device and/or a database of the managed network 300 and/or of the remote network management platform 320, among other options. In yet other case, the proxy software application 604 and/or the remote network management platform 320 could receive at least some of the mapping data 618 from client device 602, with mapping(s) in the mapping data 618 being based on input provided via a GUI displayed on the client device 602.

In any case, the mapping data 618 could include query and response mappings respectively for one or more software agents. For example, respective query mappings for software agent 614 may be between (i) formats of at least some of the discovery requests supported by the remote network management platform 320 and (ii) at least some of the query expressions supported by software agent 614. And respective response mappings for software agent 614 may be between (i) formats of at least some of the query responses supported by software agent 614 and (ii) at least some discovery responses supported by the remote network management platform 320. Similarly, respective query mappings for software agent 616 may be between (i) formats of at least some of the discovery requests supported by the remote network management platform 320 and (ii) at least some of the query expressions supported by software agent 616. And respective response mappings for software agent 616 may be between (i) formats of at least some of the query responses supported by software agent 616 and (ii) at least some discovery responses supported by the remote network management platform 320.

For a given software agent, its respective query mappings in the mapping data 618 could include various discovery requests. In particular, the query mappings may map at least some of the discovery request(s) that the remote network management platform 320 can use to facilitate agentless discovery. For example, the remote network management platform 320 can use a particular discovery request to obtain particular information via agentless discovery, and that particular discovery request could be mapped to a particular query expression that causes the software agent to provide that particular information. Additionally or alternatively, the query mappings may map discovery request(s) other than those that the remote network management platform 320 can use to facilitate agentless discovery. For example, a certain query expression could cause the software agent to provide certain information, but the remote network management platform 320 may not be capable of obtaining such information via agentless discovery. Yet, the query mappings may map this query expression to an appropriate discovery request, so that the remote network management platform 320 can use this discovery request to trigger agent-assisted discovery to obtain the information at issue from the software agent.

Generally, a given query mapping may associate a query expression with a format of a discovery request in various ways. For example, the query expression may include predefined text string(s) and variable(s) that are to be defined in respective locations within the query expression. Also, the associated discovery request may include predefined text string(s) that are likely different from those of the query expression, and may also include at least some of the same variable(s) that the query expression includes. Those variable(s) may be defined in respective locations within the discovery request. As such, the query mapping may include respective associations between variables of the discovery request and their corresponding variables in the query expression.

For example, the query mapping may associate a device identifier variable in the query expression with a device identifier variable in the discovery request, and may associate a file path variable in the query expression with a file path variable in the discovery request. In this way, if the proxy software application 604 receives a discovery request specifying a particular device identifier and a particular file path, the proxy software application 604 could use the query mapping as basis to generate an associated query expression that includes the particular device identifier and the particular file path at their respective variable locations within the query expression.

In a more specific example, a particular discovery request may help obtain a list of active processes running on a computing device via agentless discovery, and that particular discovery request could be mapped to a query expression that causes a given software agent to provide such a list. For instance, in line with the example above for software agent 614, the query expression could have the following format: "SELECT [CPU ID], process_events", where [CPU ID] is a variable for a computing device identifier to be included in the query expression. Whereas, the discovery request could have the following format: "RUN Discovery on [CPU ID], Active Processes", where [CPU ID] is similarly a variable for a computing device identifier to be included in the discovery request. As such, the query mapping at issue may associate the [CPU ID] variable in the query expression with the [CPU ID] variable in the discovery request.

In this regard, a given discovery request could be mapped to one query expression as part of respective query mappings for one software agent and could also be mapped to a different query expression as part of respective query mappings for a different software agent, so as to facilitate seamless transition between use of those software agents for discovery. For example, referring again to the discovery request that can help obtain a list of active processes running on a computing device via agentless discovery, query mappings for software agent 614 could map this discovery request to the above-mentioned query expression that causes the software agent 614 to carry out the action at issue. And query mappings for software agent 616 could map this discovery request to the above-mentioned different query expression that causes the software agent 616 to carry out the same action. Other examples are also possible.

Further, respective response mappings for a given software agent in the mapping data 618 could also take various forms. For example, the software agent could be configured to provide a query response that includes information about a computing device in one or more data fields. A given data field may correspond to a certain attribute of the computing device (e.g., operating system type), such that information included in that data field specifies the attribute (e.g., WINDOWS®). Therefore, a response mapping could map the given data field of the query response to at least one of the item attributes supported by the remote network management platform 320 (e.g., to the operating system type attribute). Such response mappings could also be configured for any other data field(s) of the query response, for respective data field(s) of other query response(s) supported by the software agent, and/or for respective data field(s) of other query response(s) supported by other software agent(s), among other options.

In this way, if the proxy software application 604 receives, from a particular software agent, a query response including information in a particular data field, the proxy software application 604 could (i) determine a particular item attribute that is mapped to the particular data field according to response mappings for that particular agent, and (ii) generate a discovery response that associates the information in the particular data field with the particular item attribute supported by the remote network management platform 320. The proxy software application 604 could provide this discovery response to the remote network management platform 320, and the remote network management platform 320 could use the discovery response as basis to store the information (e.g., in database 606) as the particular item attribute for the computing device. Other examples are also possible.

Furthermore, the proxy software application 604 could have access to priority information 620 that prioritizes software agent(s) relative to one another and/or that indicates whether or not to prioritize certain software agent(s) over agentless discovery. In some cases, the proxy software application 604 could be configured with the priority information 620 via engineering input. In other cases, the priority information 620 could be stored on and accessible via a server device and/or a database of the managed network 300 and/or of the remote network management platform 320, among other options. In yet other case, the proxy software application 604 and/or the remote network management platform 320 could receive at least some of the priority information 620 from client device 602, with one or more of the priorities in the priority information 620 being based on input provided via a GUI displayed on the client device 602. In this way, a user could indicate, via the GUI, an enterprise's preferences with respect to which software agent should be used for discovery and/or which type of discovery should be used, among other possibilities.

Given this, the proxy software application 604 could use the priority information 620 to determine which software agent to use for discovery of a computing device and/or whether to use agent-assisted discovery rather agentless discovery of the computing device. In doing so, the proxy software application 604 could determine the type of discovery that has the highest priority according to the priority information 620 (e.g., a particular software agent) and could also determine whether this type of discovery is possible on the computing device. If the highest-priority type of discovery is possible on the computing device, then the proxy software application 604 could proceed to use this type of discovery. However, if the highest-priority type of discovery is not possible on the computing device (e.g., if the particular software agent is not deployed on the computing device), then the proxy software application 604 could determine the type of discovery that is next in priority according to the priority information 620 and could carry out that type of discovery if possible, and so on.

To facilitate this, the proxy software application 604 could determine in various ways whether a certain type of discovery is possible on a computing device. For example, the proxy software application 604 could have access to a list indicating which software agent(s) are deployed on which computing device(s) of the managed network 300.

The proxy software application 604 could access or otherwise obtain such a list in various ways. For example, the proxy software application 604 could generate such a list based on information that software agent(s) provide to indicate computing device(s) on which the software agent(s) are respectively deployed, such as following establishment of secured communication session(s) with those software agent(s) in line with the discussion above. In another example, the proxy software application 604 could be configured with the list via engineering input. In yet another example, the list could be stored on and accessible via a server device and/or a database of the managed network 300 and/or of the remote network management platform 320, among other options. In yet another example, the proxy software application 604 and/or the remote network management platform 320 could receive the list from client device 602, the list being based on input provided via a GUI displayed on the client device 602. Other examples are also possible.

Accordingly, the proxy software application 604 could use the priority information 620 to select the highest-priority type of discovery that is possible in a given discovery-related situation.

In one example situation, the proxy software application 604 could prioritize a particular software agent over other software agent(s) and/or over agentless discovery. For example, the proxy software application 604 could receive, from the remote network management platform 320, a discovery request that requests information related to computing device 610. In turn, the proxy software application 604 could determine (i) that the priority information 620 prioritizes the software agent 614 over software agent 616 as well as over agentless discovery and (ii) that the software agent 614 is deployed on the computing device 610. Based on this determination, the proxy software application 604 could determine that the discovery request is to be performed by way of the software agent 614 rather than by way of software agent 616 and/or by way of agentless discovery.

In another example situation, the proxy software application 604 could use a lower-priority software agent over a higher-priority software agent if the higher-priority software agent is not deployed on a targeted computing device. For example, the proxy software application 604 could receive, from the remote network management platform 320, a discovery request that requests information related to computing device 612. In turn, the proxy software application 604 could determine that the priority information 620 prioritizes the software agent 614 over software agent 616, but may also determine that software agent 614 is not deployed on computing device 612. Responsive to determining that software agent 614 is not deployed on computing device 612 and based on software agent 616 being deployed on computing device 612 and being next in priority according to priority information 620, the proxy software application 604 could determine that the discovery request is to be performed by way of software agent 616.

In yet another example situation, the proxy software application 604 could use agentless discovery over software agent(s) that are of higher priority compared to agentless discovery, such as when the software agent(s) are not deployed on a targeted computing device. For example, the proxy software application 604 could receive, from the remote network management platform 320, a discovery request that requests information related to a particular computing device. In turn, the proxy software application 604 could determine that the priority information 620 prioritizes one or more software agent(s) over agentless discovery, but may also determine that none of those software agent(s) are deployed on the computing device. Responsive to determining that none of the software agent(s) are deployed on the computing device and based on agentless discovery being next in priority after the software agent(s) according to the priority information 620, the proxy software application 604 could determine that the discovery request is to be performed by way of agentless discovery. Other examples situations are also possible.

In a system arranged as described above, the proxy software application 604 could engage in agent-assisted discovery in response to receiving a discovery request 622 from the remote network management platform 320 (or more specifically from computational instance 322). The proxy software application 604 could receive such a discovery request 622 in various ways. For example, the remote network management platform 320 could transmit discovery request(s) to the proxy software application 604 according to a schedule, which may be a predefined schedule or may be a schedule established based on input provided via client device 602, among other options. In another example, a task list on computational instance 322 (e.g., task list 502) may be populated (e.g., according to input provided via client device 602) with task(s) that correspond to discovery request(s), and proxy software application 604 could query the task list to obtain a task corresponding to a given discovery request.

Once the proxy software application 604 receives the discovery request 622, the proxy software application 604 could determine that the discovery request 622 targets a particular computing device and is to be performed by a particular software agent. For example, the discovery request 622 could programmatically specify a request for particular information about computing device 610, and the proxy software application 604 could thus read the discovery request 622 to determine that the computing device 610 is being targeted by the discovery request 622. Moreover, the proxy software application 604 could determine that the discovery request 622 is to be performed by software agent 614 according to priority information 620 and based on a determination that software agent 614 is deployed on the computing device 610, in line with the discussion above.

Subsequently, the proxy software application 604 could engage in agent-assisted discovery using the software agent 614 determined to perform the discovery request 622. In this process, the proxy software application 604 could use the discovery request 622 as basis to generate, by way of respective query mappings in mapping data 618 for software agent 614, a query expression 624 supported by software agent 614, and do so as described herein. The proxy software application 604 could then transmit the generated query expression 624 to the software agent 614 and could receive, from the software agent 614, a query response 626 specifying the requested information 628 related to the computing device 610. In turn, the proxy software application 604 could use the query response 626 as basis to generate, by way of respective response mappings in the mapping data 618 for software agent 614, a discovery response 630 supported by the remote network management platform 320, and do so as described herein. This discovery response 630 may represent information 632, which may include some or all of the information 628 from the query response 626 and/or may include a modified version of at least some of the information 628, among other options.

On this point, generating a discovery response could sometimes involve file format conversion. For example, a query response from a software agent might be included within or may otherwise take the form of JavaScript Object Notation (JSON) file(s), XML file(s), or other type(s) of text file(s), among other options. However, remote network management platform 320 might not support the file format of the query response, and thus proxy software application 604 could generate the discovery response to have a file format supported by the remote network management platform 320. In practice, this may involve the proxy software application 604 using currently known and/or future-developed techniques to convert an obtained query response having a certain file format (e.g., JSON) to a discovery response having another format (e.g., XML). Other examples are also possible.

In any case, after the proxy software application 604 generates the discovery response 630, the proxy software application 604 could transmit the discovery response 630 to the remote network management platform 320. Once the remote network management platform 320 receives the discovery response 630, the remote network management platform 320 could take one or more actions. For example, the remote network management platform 320 could store, in database 606, the information 632 related to computing device 610 as configuration item(s). Additionally or alternatively, the remote network management platform 320 could transmit the information 632 to client device 602, so that client device 602 could display the information 632 via browser 608, for example. Other examples are also possible.

According to the present disclosure, the proxy software application 604 could engage in agent-assisted discovery using one or more software agents. For example, the proxy software application 604 could engage in agent-assisted discovery using software agent 614 as described above, and could also engage in agent-assisted discovery using software agent 616.

For example, the proxy software application 604 could receive a different discovery request that targets computing device 612, and could determine that the different discovery request is to be performed by way of software agent 614. The proxy software application 604 could use the different discovery request as basis to generate, by way of respective query mappings in mapping data 618 for software agent 616, a different query expression supported by software agent 616. The proxy software application 604 could then transmit this generated query expression to the software agent 616 and could receive, from the software agent 616, a query response specifying the requested information related to the computing device 612. In turn, the proxy software application 604 could use this query response as basis to generate, by way of respective response mappings in the mapping data 618 for software agent 616, a discovery response supported by the remote network management platform 320, which may represent the information from the query response. The proxy software application 604 could then transmit this discovery response to the remote network management platform 320. Other examples are also possible.

In some implementations, an entity other than proxy software application 604 could carry out the above-described translation(s) and/or prioritization. For example, the remote network management platform 320 (or more specifically computational instance 322) could have access to the mapping data 618 and could thus carry the translation(s). In this process, the remote network management platform 320 could determine that a discovery request targets a particular computing device and is to be performed by a particular software agent. Given this, the remote network management platform 320 could use the discovery request as basis to generate, by way of mapping data 618, a query expression supported by the software agent, and could then transmit the query expression to the proxy software application 604. The proxy software application 604 could provide the query expression to the software agent, could receive a query response from the software agent, and could transmit the query response to the remote network management platform 320. The remote network management platform 320 could then use the query response as basis to generate, by way of mapping data 618, a discovery response supported by the remote network management platform 320, and could then store, in database 322, information included in the discovery response and/or carry out other action(s). Other implementations are also possible.

In a further aspect, the present disclosure also provides for a GUI that enables submission of request(s) for information to software agent(s) via a client device (e.g., client device 602). The GUI could include interface element(s) for specifying such request(s). In one case, the interface element(s) could enable submission of a query expression supported by a given software agent, so as to request certain information about a computing device from the software agent. In another case, the interface element(s) could enable submission of a discovery request for certain information about a computing device, which could be performed by a software agent. For example, a user could select the desired information from a drop-down menu in the GUI, could enter respective identifiers of computing device(s) into field(s) of the GUI, and could optionally select a software agent to perform discovery, so as to trigger a discovery request for the information about the computing device(s).

In any case, the remote network management platform 320 could facilitate discovery in various ways according to the request(s) submitted via the GUI, so as to then provide the requested information for display via the GUI.

For example, the remote network management platform 320 could provide, to the client device 602 a representation of the GUI that includes interface elements for specifying query expression(s) supported by software agent(s). In turn, the remote network management platform 320 could receive, from the client device 602 and by way of the GUI, a particular query expression supported by a particular software agent, and the remote network management platform 320 could transmit the query expression to the proxy software application 604. The proxy software application 604 could then bypass the mapping data 618 (or more specifically the query mappings for the software agent) and transmit the query expression to the software agent. The software agent could provide a query response to the proxy software application 604, and the proxy software application 604 could bypass the mapping data 618 (or more specifically the response mappings for the particular software agent) and transmit the query response to the remote network management platform 320. The remote network management platform 320 could then provide, to the client device 602, an updated representation of the GUI that displays a version of the query response.

In another example, the remote network management platform 320 could provide, to the client device 602 a representation of the GUI that includes interface elements for specifying discovery request(s). In turn, the remote network management platform 320 could receive, from the client device 602 and by way of the GUI, a discovery request for information about a certain computing device, and the remote network management platform 320 could transmit the discovery request to the proxy software application 604. The proxy software application 604 could determine that the discovery request is to be performed by a particular software agent, could translate the discovery request into a query expression supported by that software agent, and could transmit the query expression to the software agent. The software agent may respond to the query expression by providing a query response including the requested information to the proxy software application 604. The proxy software application 604 could then translate the query response into a discovery response that includes the information and that is supported by the remote network management platform 320, and could then provide the discovery response to the remote network management platform 320. The remote network management platform 320 could then provide, to the client device 602, an updated representation of the GUI that displays a version of the discovery response. Other examples are also possible.

In this way, an enterprise could use the GUI to submit request(s) for information to software agent(s) via the remote network management platform 320. User(s) could submit such request(s) at any time and could receive requested information substantially in real-time. This may be particularly beneficial when user(s) urgently need to obtain certain information about computing device(s), such as when IT professionals attempt to remediate urgent issues encountered by the computing device(s), among other possibilities.

VII. Example Operations

Figure 7:
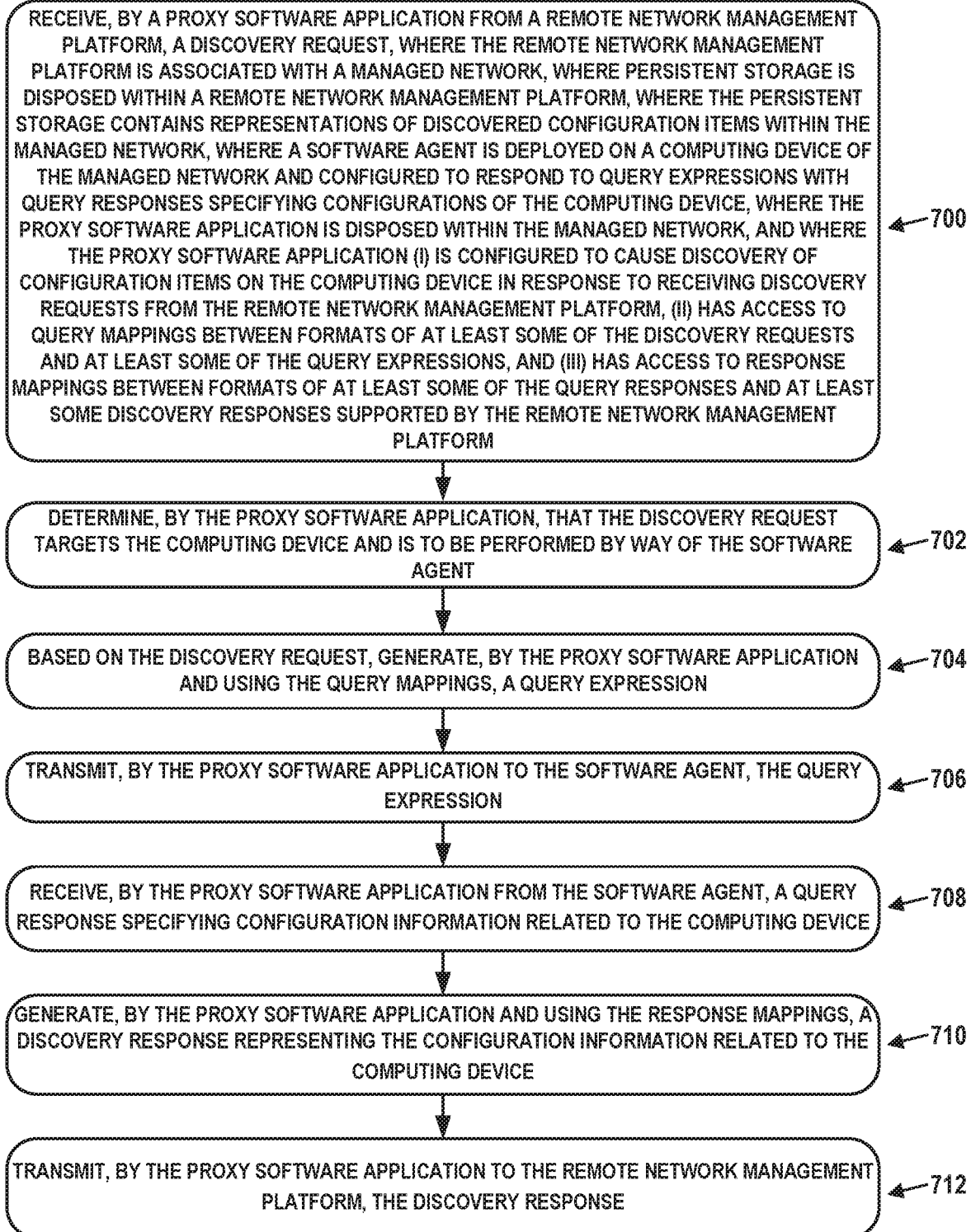
FIG. 7 is another flow chart, in accordance with example embodiments.

FIG. 7 is a flow chart illustrating an example embodiment. The process illustrated by FIG. 7 may be carried out by a computing system, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 7 may be simplified by the removal of any one or more of the features shown therein. Further, these embodiments may be combined with features, aspects, and/or implementations of any of the previous figures or otherwise described herein.

Block 700 may involve receiving, by a proxy software application from a remote network management platform, a discovery request, where the remote network management platform is associated with a managed network, where persistent storage is disposed within a remote network management platform, where the persistent storage contains representations of discovered configuration items within the managed network, where a software agent is deployed on a computing device of the managed network and configured to respond to query expressions with query responses specifying configurations of the computing device, where the proxy software application is disposed within the managed network, and where the proxy software application (i) is configured to cause discovery of configuration items on the computing device in response to receiving discovery requests from the remote network management platform, (ii) has access to query mappings between formats of at least some of the discovery requests and at least some of the query expressions, and (iii) has access to response mappings between formats of at least some of the query responses and at least some discovery responses supported by the remote network management platform.

Block 702 may involve determining, by the proxy software application, that the discovery request targets the computing device and is to be performed by way of the software agent.

Block 704 may involve, based on the discovery request, generating, by the proxy software application and using the query mappings, a query expression.

Block 706 may involve transmitting, by the proxy software application to the software agent, the query expression.

Block 708 may involve receiving, by the proxy software application from the software agent, a query response specifying configuration information related to the computing device.

Block 710 may involve generating, by the proxy software application and using the response mappings, a discovery response representing the configuration information related to the computing device.

Block 712 may involve transmitting, by the proxy software application to the remote network management platform, the discovery response.

In some embodiments, the remote network management platform may be configured to: receive, from the proxy software application, the discovery response; and store, in the persistent storage, the configuration information related to the computing device as configuration items.

In some embodiments, a different software agent may also be deployed on the computing device, the proxy software application may have access to priority information that prioritizes the software agent over the different software agent, and the proxy software application may use the priority information as basis to determine that the discovery request is to be performed by way of the software agent rather than by way of the different software agent.

In some embodiments, a different software agent may be deployed on one or more other computing devices of the managed network, the the proxy software application may have access to priority information indicating that the software agent is next in priority after the different software agent, thereby prioritizing the different software agent over the software agent. In such embodiments, (i) the proxy software application may be further configured to determine that the different software agent is not deployed on the computing device, and (ii) determining that the discovery request is to be performed by way of the software agent may involve determining, in response to determining that the different software agent is not deployed on the computing device and based on the the software agent being next in priority according to the priority information, that the discovery request is to be performed by way of the software agent rather than by way of the different software agent.

In some embodiments, the proxy software application may have access to priority information indicating that agentless discovery is next in priority after the software agent, thereby prioritizing the software agent over the agentless discovery, and the proxy software application may be further configured to: receive, from the remote network management platform, a different discovery request that targets a different computing device; determine that the software agent is not deployed on the different computing device; in response to determining that the software agent is not deployed on the different computing device and based on the agentless discovery being next in priority according to the priority information, determine that the different discovery request is to be performed by way of the agentless discovery rather than by way of the software agent; and engage in the agentless discovery of configuration items on the different computing device in response to receiving the different discovery request.

In some embodiments, a different software agent may also be deployed on the computing device and may be configured to respond to different query expressions with different query responses specifying configurations of the computing device. Additionally, the proxy software application may also (i) have access to different query mappings between formats of at least some of the discovery requests and at least some of the different query expressions, and (ii) have access to different response mappings between formats of at least some of the different query responses and at least some of the discovery responses supported by the remote network management platform.

In such embodiments, the proxy software application may be further configured to: receive, from the remote network management platform, a different discovery request, where the different discovery request is also for the configuration information related to the computing device; determine that the different discovery request targets the computing device and is to be performed by way of the different software agent rather than by way of the software agent; based on the different discovery request, generate, by way of the different query mappings, a different query expression; transmit, to the different software agent, the different query expression; receive, from the different software agent, a different query response specifying the configuration information related to the computing device; and generate, based on the different query response and by way of the different response mappings, a different discovery response representing the configuration information related to the computing device.

In some embodiments, the proxy software application may be further configured to: establish a secured communication session with the software agent; after establishing the secured communication session, receive, from the software agent, information indicating that the software agent is deployed on the computing device; and based on the information indicating that the software agent is deployed on the computing device, transmit, to the remote network management platform, an indication that configuration items of the computing device are discoverable by way of the software agent.

In some embodiments, the proxy software application may be further configured to: receive, from the remote network management platform, a particular query expression from among the query expressions supported by the software agent; bypass the query mappings and transmit, to the software agent, the particular query expression received from the remote network management platform; in response to transmitting the particular query expression, receive, from the software agent, a particular query response; and bypass the response mappings and transmit, to the remote network management platform, the particular query response.

In such embodiments, the remote network management platform may be configured to: provide, to a client device associated with the managed network, a representation of a GUI that includes interface elements for specifying one or more of the query expressions supported by the software agent; receive, from the client device and by way of the GUI, the particular query expression; transmit, to the proxy software application, the particular query expression; receive, from the proxy software application, the particular query response; and provide, to the client device, an updated representation of the GUI that displays a version of the particular query response.

VIII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computing system comprising:
    persistent storage disposed within a remote network management platform associated with a managed network, wherein the persistent storage contains representations of discovered configuration items within the managed network, and wherein a software agent is deployed on a computing device of the managed network and configured to respond to query expressions with query responses specifying configurations of the computing device; and
    a proxy software application disposed within the managed network, wherein the proxy software application: (i) is configured to cause discovery of configuration items on the computing device in response to receiving discovery requests from the remote network management platform, (ii) has access to query mappings between formats of at least some of the discovery requests and at least some of the query expressions, and (iii) has access to response mappings between formats of at least some of the query responses and at least some discovery responses supported by the remote network management platform, and wherein the proxy software application is configured to:
        receive, from the remote network management platform, a discovery request;
        determine that the discovery request targets the computing device and is to be performed by way of the software agent;
        based on the discovery request, generate, by way of the query mappings, a query expression;
        transmit, to the software agent, the query expression;
        receive, from the software agent, a query response specifying configuration information related to the computing device;
        generate, by way of the response mappings, a discovery response representing the configuration information related to the computing device; and
        transmit, to the remote network management platform, the discovery response.

2. The computing system of claim 1, wherein the remote network management platform is configured to:
    receive, from the proxy software application, the discovery response; and
    store, in the persistent storage, the configuration information related to the computing device as configuration items.

3. The computing system of claim 1,
wherein the proxy software application supports agentless discovery of configuration items on the computing device in response to receiving the discovery request,
wherein the the proxy software application has access to priority information that prioritizes discovery by way of the software agent over the agentless discovery, and
wherein the proxy software application uses the priority information as basis to determine that the discovery request is to be performed by way of the software agent rather than by way of the agentless discovery.

4. The computing system of claim 1,
wherein a different software agent is also deployed on the computing device,
wherein the proxy software application has access to priority information that prioritizes the software agent over the different software agent, and
wherein the proxy software application uses the priority information as basis to determine that the discovery request is to be performed by way of the software agent rather than by way of the different software agent.

5. The computing system of claim 1, wherein a different software agent is deployed on one or more other computing devices of the managed network, wherein the the proxy software application has access to priority information indicating that the software agent is next in priority after the different software agent, thereby prioritizing the different software agent over the software agent, and wherein the proxy software application is further configured to:
determine that the different software agent is not deployed on the computing device, and
wherein determining that the discovery request is to be performed by way of the software agent comprises determining, in response to determining that the different software agent is not deployed on the computing device and based on the the software agent being next in priority according to the priority information, that the discovery request is to be performed by way of the software agent rather than by way of the different software agent.

6. The computing system of claim 1, wherein the proxy software application has access to priority information indicating that agentless discovery is next in priority after the software agent, thereby prioritizing the software agent over the agentless discovery, and wherein the proxy software application is further configured to:
receive, from the remote network management platform, a different discovery request that targets a different computing device;
determine that the software agent is not deployed on the different computing device;
in response to determining that the software agent is not deployed on the different computing device and based on the agentless discovery being next in priority according to the priority information, determine that the different discovery request is to be performed by way of the agentless discovery rather than by way of the software agent; and
engage in the agentless discovery of configuration items on the different computing device in response to receiving the different discovery request.

7. The computing system of claim 1,
wherein a different software agent is also deployed on the computing device and is configured to respond to different query expressions with different query responses specifying configurations of the computing device, and
wherein the proxy software application also (i) has access to different query mappings between formats of at least some of the discovery requests and at least some of the different query expressions, and (ii) has access to different response mappings between formats of at least some of the different query responses and at least some of the discovery responses supported by the remote network management platform.

8. The computing system of claim 7, wherein the proxy software application is further configured to:
receive, from the remote network management platform, a different discovery request, wherein the different discovery request is also for the configuration information related to the computing device;
determine that the different discovery request targets the computing device and is to be performed by way of the different software agent rather than by way of the software agent;
based on the different discovery request, generate, by way of the different query mappings, a different query expression;
transmit, to the different software agent, the different query expression;
receive, from the different software agent, a different query response specifying the configuration information related to the computing device; and
generate, based on the different query response and by way of the different response mappings, a different discovery response representing the configuration information related to the computing device.

9. The computing system of claim 1, wherein the proxy software application is further configured to:
establish a secured communication session with the software agent;
after establishing the secured communication session, receive, from the software agent, information indicating that the software agent is deployed on the computing device; and
based on the information indicating that the software agent is deployed on the computing device, transmit, to the remote network management platform, an indication that configuration items of the computing device are discoverable by way of the software agent.

10. The computing system of claim 1, wherein the proxy software application is further configured to:
receive, from the remote network management platform, a particular query expression from among the query expressions supported by the software agent;
bypass the query mappings and transmit, to the software agent, the particular query expression received from the remote network management platform;
in response to transmitting the particular query expression, receive, from the software agent, a particular query response; and
bypass the response mappings and transmit, to the remote network management platform, the particular query response.

11. The computing system of claim 10, wherein the remote network management platform is configured to:
provide, to a client device associated with the managed network, a representation of a graphical user interface (GUI) that includes interface elements for specifying one or more of the query expressions supported by the software agent;
receive, from the client device and by way of the GUI, the particular query expression;

transmit, to the proxy software application, the particular query expression;
receive, from the proxy software application, the particular query response; and
provide, to the client device, an updated representation of the GUI that displays a version of the particular query response.

12. A method comprising:
receiving, by a proxy software application from a remote network management platform, a discovery request, wherein the remote network management platform is associated with a managed network, wherein persistent storage is disposed within a remote network management platform, wherein the persistent storage contains representations of discovered configuration items within the managed network, wherein a software agent is deployed on a computing device of the managed network and configured to respond to query expressions with query responses specifying configurations of the computing device, wherein the proxy software application is disposed within the managed network, and wherein the proxy software application (i) is configured to cause discovery of configuration items on the computing device in response to receiving discovery requests from the remote network management platform, (ii) has access to query mappings between formats of at least some of the discovery requests and at least some of the query expressions, and (iii) has access to response mappings between formats of at least some of the query responses and at least some discovery responses supported by the remote network management platform;
determining, by the proxy software application, that the discovery request targets the computing device and is to be performed by way of the software agent;
based on the discovery request, generating, by the proxy software application and using the query mappings, a query expression;
transmitting, by the proxy software application to the software agent, the query expression;
receiving, by the proxy software application from the software agent, a query response specifying configuration information related to the computing device;
generating, by the proxy software application and using the response mappings, a discovery response representing the configuration information related to the computing device; and
transmitting, by the proxy software application to the remote network management platform, the discovery response.

13. The method of claim 12,
wherein the proxy software application supports agentless discovery of configuration items on the computing device in response to receiving the discovery request,
wherein the the proxy software application has access to priority information that prioritizes discovery by way of the software agent over the agentless discovery, and
wherein determining that the discovery request is to be performed by way of the software agent comprises, based on the priority information, determining that the discovery request is to be performed by way of the software agent rather than by way of the agentless discovery.

14. The method of claim 12,
wherein a different software agent is also deployed on the computing device,
wherein the the proxy software application has access to priority information that prioritizes the software agent over the different software agent, and
wherein determining that the discovery request is to be performed by way of the software agent comprises, based on the priority information, determining that the discovery request is to be performed by way of the software agent rather than by way of the different software agent.

15. The method of claim 12, wherein a different software agent is deployed on one or more other computing devices of the managed network, wherein the the proxy software application has access to priority information indicating that the software agent is next in priority after the different software agent, thereby prioritizing the different software agent over the software agent, and wherein determining that the discovery request is to be performed by way of the software agent comprises:
determining that the different software agent is not deployed on the computing device; and
wherein determining that the discovery request is to be performed by way of the software agent comprises determining, in response to determining that the different software agent is not deployed on the computing device and based on the the software agent being next in priority according to the priority information, that the discovery request is to be performed by way of the software agent rather than by way of the different software agent.

16. The method of claim 12, wherein the the proxy software application has access to priority information indicating that agentless discovery is next in priority after the software agent, thereby prioritizing the software agent over the agentless discovery, the method further comprising:
receiving, by the proxy software application from the remote network management platform, a different discovery request that targets a different computing device;
determining, by the proxy software application, that the software agent is not deployed on the different computing device;
in response to determining that the software agent is not deployed on the different computing device and based on the agentless discovery being next in priority according to the priority information, determining by the proxy software application, that the different discovery request is to be performed by way of the agentless discovery rather than by way of the software agent; and
engaging, by the proxy software application, in the agentless discovery of configuration items on the different computing device in response to receiving the different discovery request.

17. The method of claim 12,
wherein a different software agent is also deployed on the computing device and is configured to respond to different query expressions with different query responses specifying configurations of the computing device, and
wherein the proxy software application also (i) has access to different query mappings between formats of at least some of the discovery requests and at least some of the different query expressions, and (ii) has access to different response mappings between formats of at least some of the different query responses and at least some of the discovery responses supported by the remote network management platform.

18. The method of claim 12, further comprising:
receiving, by the proxy software application from the remote network management platform, a particular query expression from among the query expressions supported by the software agent;
the proxy software application bypassing the query mappings and transmitting, to the software agent, the particular query expression received from the remote network management platform;
in response to transmitting the particular query expression, receiving, by the proxy software application from the software agent, a particular query response; and
the proxy software application bypassing the response mappings and transmitting, to the remote network management platform, the particular query response.

19. The method of claim 12, further comprising:
establishing, by the proxy software application, a secured communication session with the software agent;
after establishing the secured communication session, receiving, by the proxy software application from the software agent, information indicating that the software agent is deployed on the computing device; and
based on the information indicating that the software agent is deployed on the computing device, transmitting, by the proxy software application to the remote network management platform, an indication that configuration items of the computing device are discoverable by way of the software agent.

20. An article of manufacture including a non-transitory computer-readable medium, having stored thereon program instructions that, upon execution by a computing system, cause the computing system to perform operations, wherein the computing system includes persistent storage disposed within a remote network management platform that is associated with a managed network, and wherein the persistent storage contains representations of discovered configuration items within the managed network, the operations comprising:
receiving, from the remote network management platform, a discovery request, wherein a software agent is deployed on a computing device of the managed network and configured to respond to query expressions with query responses specifying configurations of the computing device, and wherein the computing system (i) is configured to cause discovery of configuration items on the computing device in response to receiving discovery requests from the remote network management platform, (ii) has access to query mappings between formats of at least some of the discovery requests and at least some of the query expressions, and (iii) has access to response mappings between formats of at least some of the query responses and at least some discovery responses supported by the remote network management platform;
determining that the discovery request targets the computing device and is to be performed by way of the software agent;
based on the discovery request, generating, using the query mappings, a query expression;
transmitting, to the software agent, the query expression;
receiving, from the software agent, a query response specifying configuration information related to the computing device;
generating, using the response mappings, a discovery response representing the configuration information related to the computing device; and
transmitting, to the remote network management platform, the discovery response.

* * * * *